April 12, 1932.  D. H. SPIRA  1,853,157
CLUTCH BRAKE
Filed Nov. 3, 1928   2 Sheets-Sheet 1

INVENTOR
D.H. SPIRA
BY
Frank D. Gray
ATT'Y

April 12, 1932. D. H. SPIRA 1,853,157
CLUTCH BRAKE
Filed Nov. 3, 1928 2 Sheets-Sheet 2
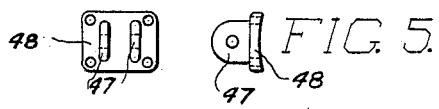
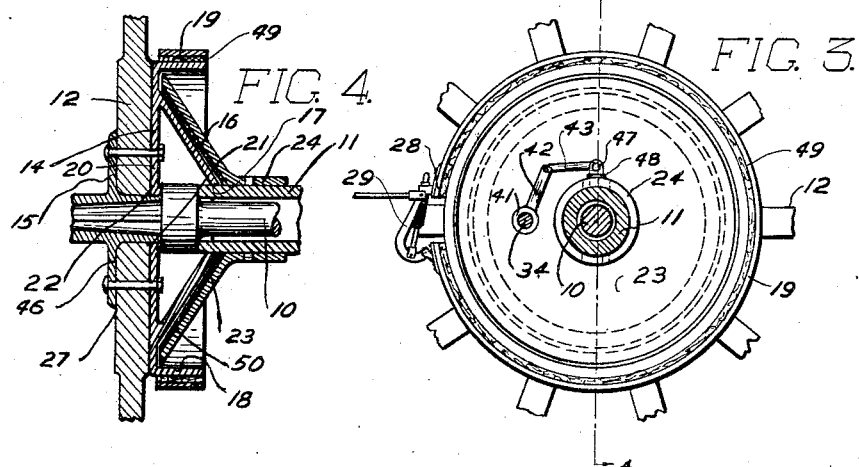
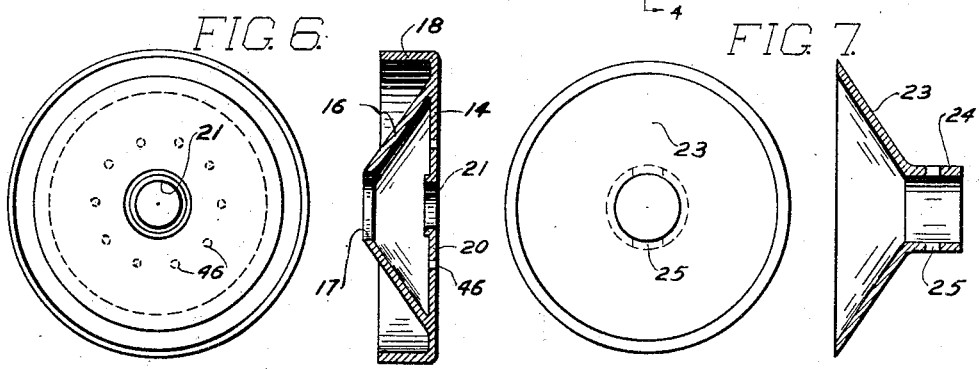
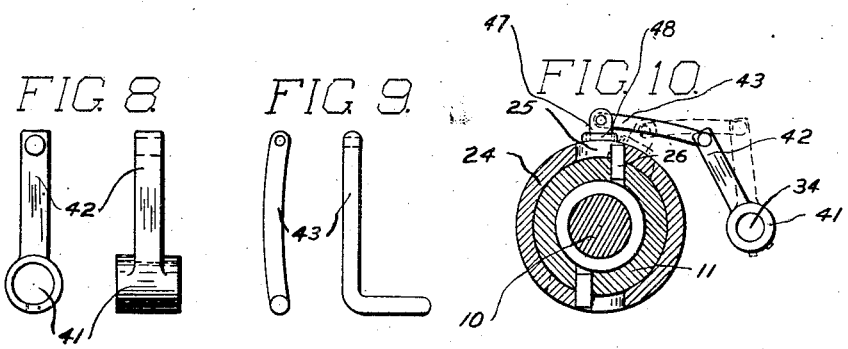
INVENTOR
D. H. SPIRA
BY Frank D. Gray
ATT'Y.

Patented Apr. 12, 1932

1,853,157

UNITED STATES PATENT OFFICE

DAVID H. SPIRA, OF CLEVELAND, OHIO

CLUTCH BRAKE

Application filed November 3, 1928. Serial No. 317,062.

This invention relates to clutch brakes and is more particularly adapted to be used for braking vehicle wheels by attaching one of the clutch elements to a wheel and mounting the other element upon the frame of the vehicle stationary therewith, so that thrusting the two elements into contact tends to produce a retarding effect upon the rotation of the wheel and the advance of the vehicle.
It is an object of my invention to enlarge the effective braking surface of the parts in contact to the greatest limit, and to do so without vitally changing the actuating mechanism therefor, or increasing the power essential for applying the braking force to the wheels. My brake mechanism will therefore, be found especially effective when applied to motor-driven wheels. It is a further object of my invention to provide for mounting the male brake member upon the wheel whereby a centralization tendency is effected upon the wheel by the outer and female brake cone member which is stationary upon the frame and thrust against the wheel cone in operation of the device.

A still further object of my invention is the provison of a cone member integral with an outer cylindrical brake rim, the entire brake element being mounted upon the spokes of the wheel to be retarded. This latter construction provides for a cone brake and a band brake separately applied to an integral structure, and adapted to be operated separately or at one time, as desired.
A still further object of my invention is the provision of an effective rotative sleeve integral with the stationary cone member, and mounted upon an inner cylindrical sleeve member within which the axle is positioned, the said cone sleeve having inclined cam slots within which are pins carried by the inner sleeve, whereby relative rotation of the sleeve will thrust the outer cone member against the wheel cone, this arrangement of cam slots being especially effective.

With these and other objects and advantages in view, my invention resides in the combination and arrangement of parts to be hereinafter described, set forth in the claims, and illustrated in the accompanying drawings, in which—

Figure 3 is a transverse section of the brake mechanism applied to the inner ends of the spokes of a wheel and showing the sleeves and axle in section upon a plane just inside the cam slots;

Figure 4 is a sectional view of the structure in Fig. 3 taken in the plane of the line 4—4 thereof;

Figure 5 illustrates in plan and side elevation, an actuating ear device;

Figure 6 shows in plan and central cross section, an integral cone and rim brake element;

Figure 7 is a plan and cross section of a female brake element;

Figure 8 shows detail views of an actuating arm and sleeve;

Figure 9 shows detail views of an actuating link, and

Figure 10 is a cross section of the sleeves and related parts, taken in the plane indicated by the line 10—10 of Fig. 1.

Figure 1:
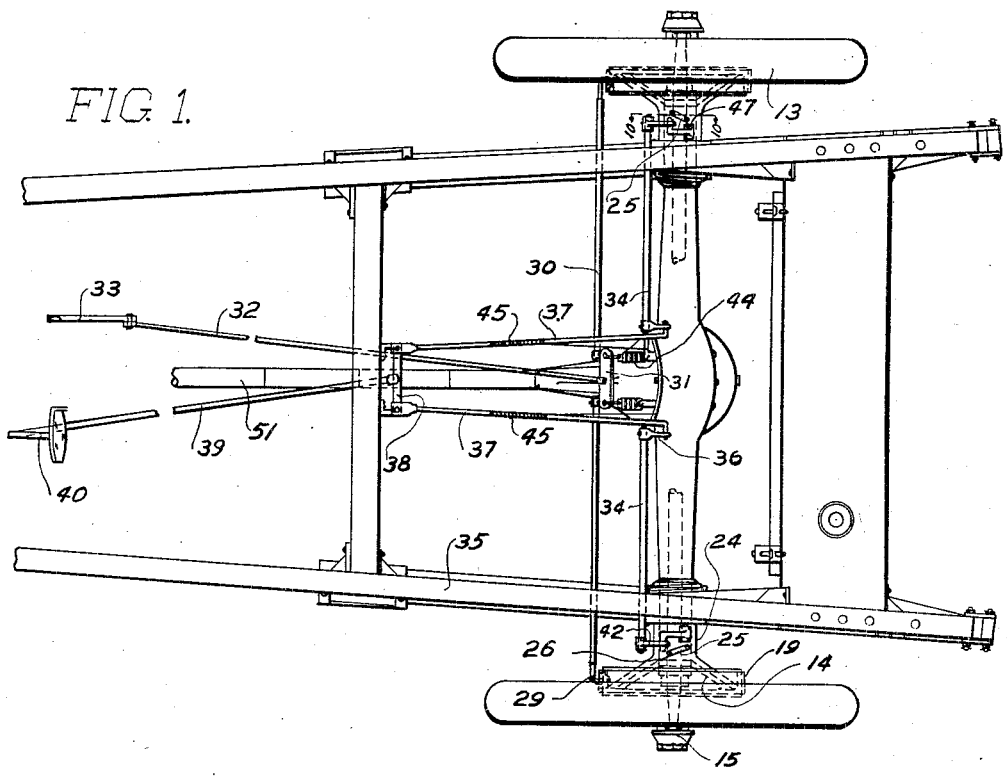
Figure 1 is a plan view of the rear end of the vehicle, with the body removed.

In the construction about to be described, I have disclosed as the preferred embodiment of my invention, the more or less conventional vehicle axle 10 surrounded by the tubing 11. Upon the inner ends of the spokes 12 of the drive wheel 13, I have mounted a compound hollow brake element 14 which is bolted to the outer end of the hub element 15, in the manner shown in Fig. 4. The element 14 effectively serves the purpose of affording a means for braking a vehicle by wholly different connecting elements and comprises an inner male brake cone 16 apertured at 17 to receive the tube 11 therethrough, and an outer cylindrical periphery 18 about which I propose to apply the band brake 19, the parts 18 and 19 serving as the usual emergency brake. It is characteristic of this structure that the parts 16 and 18 are integral, the large base of the cone 16 being integrally formed upon the flat, circular web plate 20 having a central aperture 21 through which the inner end of the hub sleeve 22 extends. The outer edge of the plate 20 extends peripherally beyond the cone and is integral with the cylinder 18 which serves as a flange of the web plate 20.

The stationary brake element for the clutch brake comprises the female cone 23 integral with the outer sleeve 24 which latter is provided with slots 25 inclined to the plane of the axle, as shown in Fig. 1, and into which the substantially radial pins 26 project, as shown clearly in Fig. 10, the pins being carried fixedly by the tubing 11, so that relative rotation of the tubes 11 and 24 will result in an outer sliding movement of the cone 23 into engagement with the outer surface of the male cone 16 carried by the wheel, thus resulting in retarding the wheel. The plate 20 is apertured, as at 46 to receive the bolts 27 which securely mount the brake element 14 upon the wheel. The band brake 19 is actuated in the conventional manner upon the cylinder 18 by tightening the separated ends 28, as by the usual lever action shown at 29 in Figs. 1 and 3, the actuating rocking bars 30 being operated by the cross bar 31, rod 32 and conventional lever 33.

Figure 2:
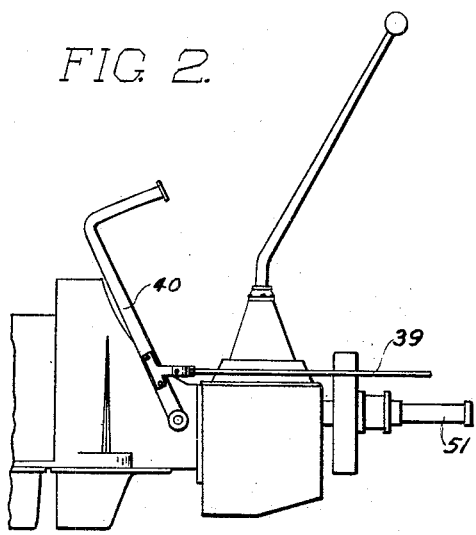
Figure 2 is a diagrammatic view in side elevation, of the control levers and adjoining parts.

In Fig. 1 is shown the manner of actuating the cone brake mechanism, the alined rocking bars 34 being mounted upon the machine frame and crossing the sills 35. The inner ends of these bars are provided with cranks 36 operated by links 37 drawn by a common cross bar 38 positioned somewhat forward of the bar 31. Connected to this bar 38 is the pull rod 39 which is actuated by the conventional pedal lever 40, as shown in Figs. 1 and 2. The rocking of the bars 34 in a counter-clockwise direction, as shown in Fig. 3, or clockwise, as shown in Fig. 10, will rock the sleeves 41 together with their actuating arms 42 which, through the agency of the links 43, will tend to rotate the sleeves 24 and their cone elements 23, which movement will by rocking the oblique slots 25, shown in Fig. 1 in contact with the stationary pins 26, thrust the female cones 23 outward against and about the rotating male cones 16, positively braking the latter and the wheels carrying the said male brake cones, as well as the en- the brake element 14.

Spring means is provided to normally hold the several brake members in released condition, the springs 44 being connected to a frame member at one end and attached to ends of the cross bar 31, so that their normal tendency will be to open the bands 19 by rocking the bars 30, in the manner well understood. Operating the lever 33 will actuate the bar against the force of the springs 44. The rocking of the bars 34 to rotate the sleeves 24, is accomplished by the forward pull of the bar 38 and the consequent forward pull on the rods 37 attached to the ends of the latter bar. The normal released condition of the cone brake 16—23 I propose to accomplish by the provision of longitudinal springs 45 attached at one end to the rods 37 and to a suitable frame member at the other end. The normal tendency of these springs is therefore one of pulling the rods 37 rearwardly and against the forward thrust of the lever 40.

The rocking of the sleeves 24, shown in Fig. 10, is attained by providing the same with ears 47 which are mounted in pairs upon curved plates 48, one being fixedly secured to the outer surface of each sleeve 24. The said links 43 are pivoted at one end to the ears 47, whereby the rocking of the sleeves 41 as shown in Fig. 3 will slightly rotate the sleeve 24 with its cone 23. Other means may be used for actuating the sleeves 24 and thereby the cone brakes, but I have found the lever actuation through the agency of rocking arm and link highly efficient. It is to be understood that both forms of brakes illustrated in these drawings shall employ the more or less conventional brake linings 49 and 50, such form of brake surface being contemplated and their use assumed.

The form of power drive to be used upon vehicles employing my improved brake, need not be especially novel in itself, it being only desirable that the wheels 13 shall be driven from the axle 10, and that the latter shall be geared in the conventional way to the power shaft 51.

The manner of actuating the drive wheel brakes has a special efficiency because of my brake mechainsm being applied to both wheels with equal force. This result has a remarkable value in avoiding skidding of the drive wheels where the brakes are applied with greater strain to the wheel on one side than the other. It has always been recognized as difficult to apply wheel brakes with equal force. The shifting of a brake lever may by the conventional mechanism, retard one drive wheel very positively, while the brake actuated by the same lever may slip so easily upon the other wheel that the result at once drives the vehicle in a dangerous arc. I overcome this difficulty by connecting the two actuating rods 37 to a common cross bar 38 which is by my mechanism, permitted to swing upon the pull rod 39 connected at an intermediate point on the cross bar, whereby the two rods 37 will actuate the cone brakes of the two wheels 13 with equal force.

The use of my actuating mechanism comprising parts 34, 36, 37, 38 and 39 no longer requires special adjustments of the brake parts at the direct connection of the arms 42 with the sleeve 24. Adjustments may be fully made at the connections with the cross bar 38. A still further remarkable advantage arises from my brake mechanism, in that the composite cone and band brakes are formed as an integral element which is fully braced by the integral back plate 20, the two alined apertures 17 and 21 tending to hold the wheel to which it is attached in axial alinement with the axle 10 and tubing 11. Further, the mounting of the stationary female cone upon the tubing is also exceedingly effective since the thrust of this cone outward about and in alinement with the male cone on the driven wheel very positively steadies the wheels when the brakes are applied.

In addition to the advantages above recited accruing from my particular construction, I claim a special advantage of the use of the two brake elements, one comprising the composite element 14 and the other the stationary element comprising the cone 23 integral with the sleeve 24. It is especially advantageous that these two elements only are needed. Heretofore a third actuating element has been thought essential for actuating rotatable wheel brakes. I have overcome this by applying the actuating element directly to the sleeve 24.

It is also regarded as extremely valuable to apply the male brake element to the wheel, and mount the female brake element as a stationary sleeve upon the conventional tubing about the axle.

The construction that I have described in the foregoing and illustrated in the drawings are regarded by me as the preferred form of my invention. It is understood that I may make such changes in construction and arrangement and combination of parts, as may prove expedient and fall within the scope of my invention.

Having thus fully described my invention, what I claim as new and desire to secure by Letters Patent is:—

1. In combination, a wheel, a composite brake element fixed with respect to the wheel and comprising an outer peripheral cylindrical brake member and an inner tapered male member connected integrally with the cylindrical member by an annular web member, a laterally movable tapered female member mounted in axial alinement with the said composite brake element, the said female member having an integral axial sleeve on the side opposite the composite brake element, the said sleeve having an inclined cam slot, a fixed tube within said sleeve and having a radial pin guided in said slot, whereby slight relative rotation of the sleeve and tube will thrust the female brake member outward against and about the said male member, and means for tending to rotate said sleeve.

2. A clutch brake comprising a composite brake element having an outer cylindrical brake rim providing an outer braking surface and an inner male cone brake member connected integrally with said rim by an apertured web member, a rigid tubing encircling a vehicle axle and carrying a radial pin on its outer surface, a female cone member having an integral axial sleeve encircling said tubing and having an inclined cam slot through which said pin is guided, whereby slight rotation of the sleeve relative to the tubing will thrust the female cone member outward against and about the said male cone member, positive means for slightly rotating said sleeve in one direction to set the brake, and yielding means for normally holding the sleeve rotated in the opposite direction, a stationary band brake normally positioned loosely about said rim, and means for tightening said band.

3. A brake comprising a vehicle wheel, a male cone member detachably secured to the inner surface of said wheel, an axle inserted through the axial center of said cone member and fixedly secured to said wheel, a stationary tubing encircling the said axle and carrying a radial pin on its outer surface, an apertured female cone member slidably mounted on said tubing and having an axial sleeve integrally connected therewith and provided with an inclined cam slot through which said pin is guided, whereby slight rotation of the sleeve will thrust the female cone member outward against and about the said male cone member, an ear fixedly secured to said sleeve, a transverse actuating rod mounted parallel to said axle in bearings for rocking movement therein, an L-member extending from each end of said rod, a connecting link connecting the said ear with one of said L-members, and means for connecting the other L-member with the usual pedal lever, so that power applied to the lever will rock the said sleeve.

4. A brake member carried by each of spaced vehicle wheels, positioned in parallelism, laterally movable brake members mounted between said wheels and in axial alinement with the wheel axes, the last mentioned brake members having integral axial sleeves on the side opposite the wheel brake members, a fixed tube within each of said sleeves, each tube and sleeve having radial pin and cam slot connection, whereby relative rotation of the respective sleeves and tubes will thrust the laterally movable brake members outwardly against the wheel brake members, actuating means for each of said pin and slot connections comprising alined rocking bars, one adjacent each pin and slot connection, a common cross bar mounted parallel with the wheel axes and having link connection between each end thereof and the rocking bars for actuating said rocking bars, yielding means connecting each link with a stationary part for normally resisting rocking of said bars, and a pull rod pivotally connecting an intermediate point of said cross bar with a conventional pedal lever, so that a forward pull on said pull rod will permit the cross bar to rock on said intermediate point and actuate the wheel brakes with equal force.

5. A brake, comprising a wheel member, a male cone member carried by said wheel member, an axle, a rigid tubing encircling the axle, abutting said wheel member, a female brake cone member slidably mounted on the tubing and having an axial sleeve portion, non-rotatable thereon, the tubing and sleeve having interconnecting actuating means for engaging the brake members, means for operating said actuating means including a conventional pedal lever, a pull rod and connecting mechanism connecting the lever with said sleeve, and yielding means attaching said rod with a stationary part to resist the forward rocking of the lever and thereby normally separating the brake members.

In witness whereof, I have hereunto set my hand this 23rd day of October, A. D. 1928.

DAVID H. SPIRA.